US006721267B2

(12) United States Patent
Hiben et al.

(10) Patent No.: US 6,721,267 B2
(45) Date of Patent: Apr. 13, 2004

(54) TIME AND BANDWIDTH SCALABLE SLOT FOR MOBILE DATA SYSTEM

(75) Inventors: Bradley M. Hiben, Glen Ellyn, IL (US); Kevin G. Doberstein, Elmhurst, IL (US); Donald G. Newberg, Hoffman Estates, IL (US); Robert D. Logalbo, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 401 days.

(21) Appl. No.: 09/760,984

(22) Filed: Jan. 16, 2001

(65) Prior Publication Data

US 2002/0031189 A1 Mar. 14, 2002

Related U.S. Application Data

(63) Continuation-in-part of application No. 09/630,235, filed on Aug. 1, 2000, now Pat. No. 6,424,678.

(51) Int. Cl.⁷ ................................................. H04J 11/00
(52) U.S. Cl. ....................... 370/206; 370/476; 370/510; 375/260; 375/298; 375/364
(58) Field of Search ................................. 370/203, 204, 370/206, 210, 464, 465, 468, 476, 491, 510, 347; 375/340, 260, 261, 364, 298

(56) References Cited

U.S. PATENT DOCUMENTS 5,241,544 A * 8/1993 Jasper et al. ................ 370/478
5,343,499 A * 8/1994 Jasper et al. ................ 375/261
5,724,388 A   3/1998 Nagano et al.

FOREIGN PATENT DOCUMENTS

GB    2271693    *  4/1994
WO    WO 91/20137 * 12/1991

OTHER PUBLICATIONS

Wong, et al. Multiuser OFDM with Adaptive Subcarrier, Bit and Power Allocation, IEEE, vol. 17, No. 18, Oct. 1999, pp. 1747–1758.

* cited by examiner

Primary Examiner—Seema S. Rao
Assistant Examiner—Frank Duong
(74) Attorney, Agent, or Firm—Steve R. Santema; Terri S. Hughes (57) ABSTRACT

A scalable slot format defining positions of synchronization symbols, pilot symbols and data symbols for various numbers of sub-channels and various lengths of time in a multi-carrier communication system. An initial pattern (500) and one or more follow-on patterns (600, 700) are defined identifying positions of data symbols, synchronization symbols and pilot symbols for a first number of sub-channels corresponding to a first bandwidth. An extended pattern is constructed from the one or more follow-on patterns. The extension pattern is appended to the initial pattern to form a base pattern (810, 910, 1010). The base pattern (810, 910, 1010) is replicated zero or more times to form an expanded pattern (812, 910, 1015) identifying positions of data symbols, synchronization symbols and pilot symbols for an expanded number of sub-channels corresponding to a second bandwidth. The slot format may be implemented by a transmitter (100) having subdivided an original information signal into M bit streams and having encoded each of the M bit streams to 16QAM symbols to form M symbol streams, by inserting synchronization and pilot symbols into each of the M symbol streams at positions determined by the expanded pattern.

20 Claims, 7 Drawing Sheets

TIME AND BANDWIDTH SCALABLE SLOT FOR MOBILE DATA SYSTEM

CROSS REFERENCE TO RELATED APPLICATIONS

This application is a continuation-in-part of U.S. application Ser. No. 09/630,235 filed Aug. 1, 2000 titled "Scalable Pattern Methodology for Multi-Carrier Communication Systems," U.S. Pat. No. 6,424,678 incorporated herein by reference in its entirety.

FIELD OF THE INVENTION

This invention relates generally to multi-carrier communication systems, including but not limited to radio frequency (RF) communication systems. More particularly, this relates to a scalable pattern methodology for multi-carrier communication systems.

BACKGROUND OF THE INVENTION

Multi-carrier communication systems are well known in the art. Pursuant to many such systems, an information-bearing signal, such as serial digitized voice or digital data is subdivided into a plurality of bit streams, each of which is encoded into symbols (e.g., BPSK, QPSK, 16QAM symbols) to form a corresponding plurality of symbol streams. Synchronization and pilot symbols are inserted into each of the plurality of symbol streams, yielding a plurality of composite symbol streams. The composite symbol streams are used to modulate separate carrier signals, yielding a corresponding plurality of sub-channels each occupying a discrete frequency band and carrying a portion of the information in the original information-bearing signal. The plurality of sub-channels are combined into a composite signal that is transmitted over an RF channel from a first location to a second location. At the second location, a receiver performs generally the inverse operations, demodulating and detecting each sub-channel separately. Pilot interpolation is performed to determine the carrier's phase and to estimate the effects of channel impairments, such as fading, multi-path effects, etc., and errors are corrected to overcome the effect of the channel impairments and reconstruct the original information signal.

As is known in the art, multi-carrier communication systems can be time division multiple access (TDMA) communication systems. In a TDMA system, a RF channel is shared among multiple users by dividing it into blocks of time. The blocks of time, commonly referred to as time slots, can then be assigned to different users. In most TDMA systems, the length of each slot and the channel bandwidth are fixed so that the same amount of information is sent in each slot. Because of this, the transmitter and receiver are usually configured to work with fixed amounts of information. For example, if the information being transmitted represents a voice conversation, the voice encoder that converts the voice signal into digital information will output the digital information in fixed length blocks and the decoder at the receiver will convert fixed length blocks of data back into voice. As another example, error control coding can be done to correct for symbol errors caused by the RF channel. At the transmitter, the digital information to be transmitted is encoded. At the receiver the received digital information is decoded in such a way as to correct for errors. The encoder/decoder operations are often designed to operate on fixed length blocks of data.

Generally, the amount of information that may be carried by any communication system in a fixed length time slot is a function of the available bandwidth. One of the advantageous aspects of multi-carrier communication systems is that different channel types (e.g., having different bandwidths) may be accommodated by increasing or decreasing the number of sub-channels, to the extent that the bandwidth of the total number of sub-channels does not exceed the available bandwidth. However, if the bandwidth of the signal is scaled without changing the length of the TDMA time slots, the amount of digital information carried by the time slots would be changed. This would require the redesign of parts of the communication system such as the voice and error control coding.

Accordingly, there is a need for a method of defining TDMA time slot structures usable in a multi-carrier communication system that scale readily between different numbers of sub-channels and different corresponding bandwidths without significantly changing the amount of digital information sent in each TDMA time slot so as not to require redesign of parts of the communication system such as the voice and error control coding. The present invention is directed to satisfying or at least partially satisfying these needs.

BRIEF DESCRIPTION OF THE DRAWINGS

The foregoing and other advantages of the invention will become apparent upon reading the following detailed description and upon reference to the drawings in which.

DESCRIPTION OF A PREFERRED EMBODIMENT

The present invention provides a slot format defining positions of data symbols, synchronization symbols and pilot symbols for different lengths of time and various numbers of sub-channels in a multi-carrier communications system.

According to one embodiment of the present invention, there is provided a slot format methodology comprising the steps of defining an initial pattern and one or more follow-on patterns identifying positions of data symbols, synchronization symbols and pilot symbols for a first number of sub-channels corresponding to a first bandwidth. An extension pattern is constructed from at least one of the one or more follow-on patterns. The extension pattern is appended to the initial pattern to form a base pattern identifying positions of data symbols, synchronization symbols and pilot symbols for the first number of sub-channels corresponding to the first bandwidth. The base pattern is replicated one or more times to form an expanded pattern identifying positions of data symbols, synchronization symbols and pilot symbols for a second number of sub-channels corresponding to a second bandwidth. For example, in one embodiment the extension pattern is constructed by consecutively joining two follow-on patterns. The base pattern is formed by appending the extension pattern to the initial pattern. In another example, the extension pattern is constructed by consecutively joining only one follow-on pattern and the base pattern is formed by appending the extension pattern to the initial pattern.

According to another embodiment of the present invention, there is provided a slot format methodology defining positions of data symbols, synchronization symbols and pilot symbols for different lengths of time. The method comprises defining an initial pattern and a plurality of follow-on patterns identifying positions of data symbols, synchronization symbols and pilot symbols for a first number of sub-channels corresponding to a first bandwidth. An extension pattern is constructed by consecutively joining two or more identical follow-on patterns of the plurality of follow-on patterns. The extension pattern is appended to the initial pattern to form a base pattern identifying positions of data symbols, synchronization symbols and pilot symbols for a first number of sub-channels corresponding to a first bandwidth. For example, in one embodiment the extension pattern is constructed by consecutively joining four identical follow-on patterns and an additional follow-on pattern. The base pattern is formed by appending the extension pattern to the initial pattern.

According to still another embodiment of the present invention, in a communication system wherein information in a first information signal is subdivided into M bit streams, each of the M bit streams being encoded to QAM symbols to form M symbol streams, whereby synchronization and pilot symbols are inserted into each of the M symbol streams, yielding M composite symbol streams filling a time-division multiplex slot, there is provided a method of positioning the synchronization and pilot symbols within the time-division multiplex slot. The method comprises defining an initial pattern and a plurality of follow-on patterns identifying positions of the synchronization symbols and pilot symbols for a subset of the M composite streams for a portion of the time division multiplex slot. An extension pattern is constructed by consecutively joining two or more identical patterns of the plurality of follow-on patterns, the extension pattern identifying positions of the synchronization and pilot symbols for a subset of the M composite streams for a portion of the time division multiplex slot. The extension pattern is appended to the initial pattern to form a base pattern. The base pattern is replicated zero or more times to form an expanded pattern identifying positions of the synchronization symbols and pilot symbols within the M composite symbol streams for the entire time division multiplex slot. The synchronization and pilot symbols are inserted into the M symbol streams at positions determined by the expanded pattern.

Figure 1:
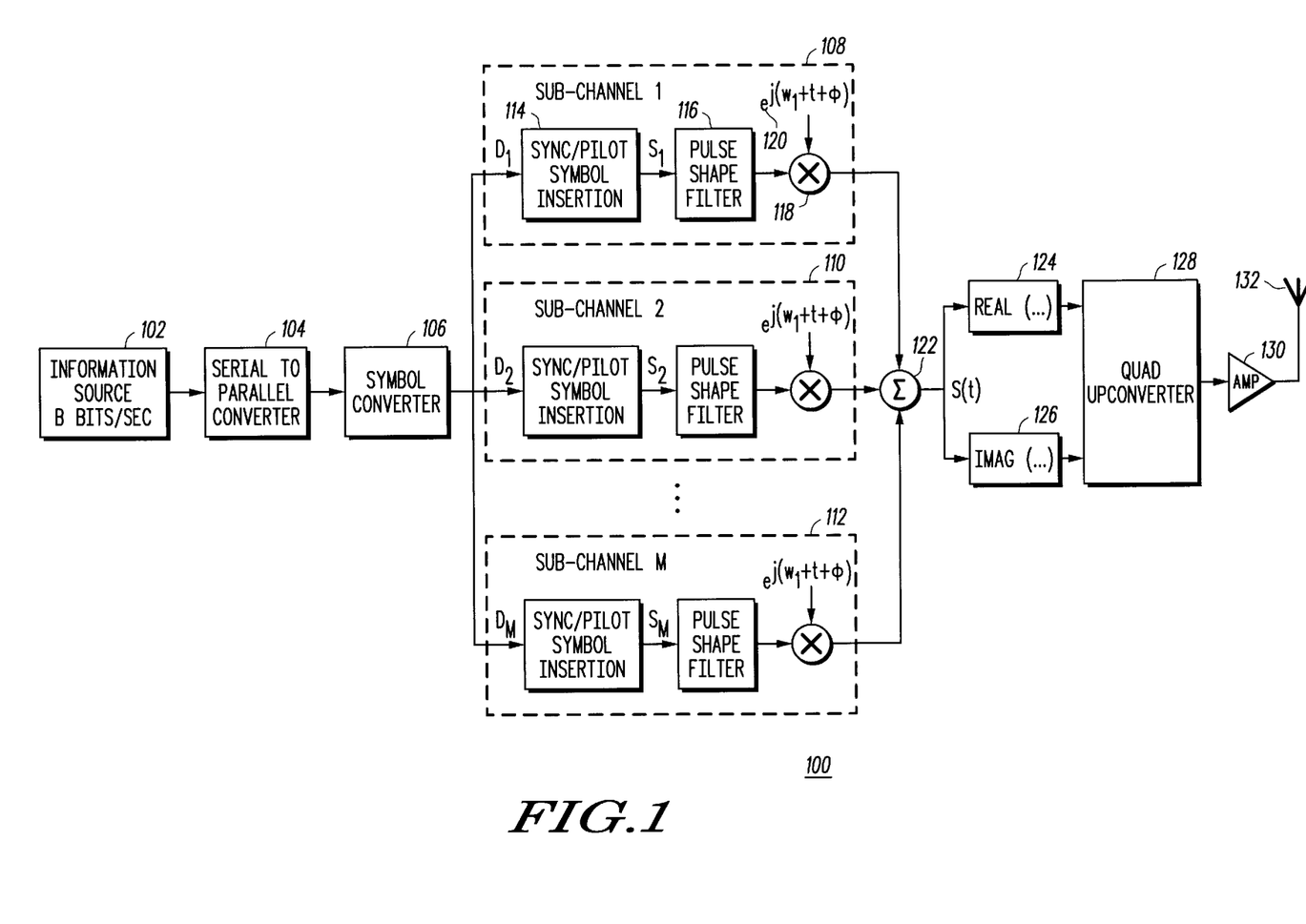
FIG. 1 is a block diagram of a multi-channel QAM transmitter according to one embodiment of the present invention.

Turning now to the drawings and referring initially to FIG. 1, there is shown an M sub-channel transmitter 100 according to one embodiment of the present invention. The transmitter 100 performs the function of transmitting a stream of binary data over a radio channel. In one embodiment, the binary data is split among M sub-channels with each sub-channel using 16QAM modulation. Alternatively, the sub-channels may use different types of modulation such as, for example, BPSK, QPSK, 64-QAM, GMSK, MSK or some combination thereof. In one embodiment, many of the functions of the transmitter 100 are performed by a digital signal processor (hereinafter "DSP") such as one of the DSP 56000 family of processors, commercially available from Motorola, Inc. As is well known in the art, a DSP is a type of microprocessor that has been optimized to perform mathematical operations at very high speeds.

The transmitter 100 receives information from an information source 102. In the embodiment of FIG. 1, the information to be transmitted comprises a stream of bits. This stream of bits can represent data from a computer, digitized voice, digitized video or any other signal that can be represented by a stream of binary digits. The bit stream from the information source is sent into a serial to parallel converter 104 where it is split into M different streams. Each of the M different bit streams is then sent into a symbol converter 106 which transforms the bit streams into symbol streams appropriate for the selected modulation type. Thus, for example, where 16 QAM modulation is used, the symbol converter 106 transforms each of the M different streams of bits into a stream of QAM symbols. Alternatively, it will be appreciated that the serial to parallel converter 104 and symbol converter 106 may be interchanged so that the stream of bits is first transformed to QAM symbols and then the resulting stream of QAM symbols is split into M different streams.

Figure 2:
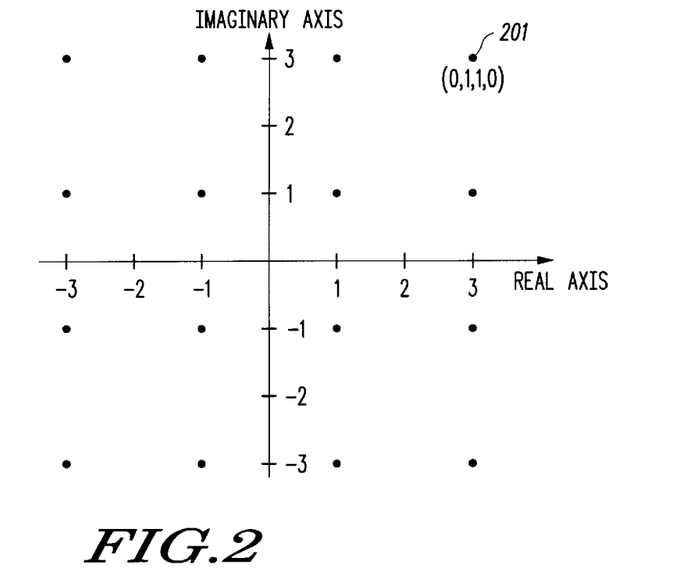
FIG. 2 shows an example of a 16-QAM symbol constellation.

In one embodiment of the invention, the symbol stream out of the symbol converter 106 comprises 16 QAM symbols. A 16-QAM system uses an alphabet of 16 discrete complex symbols. For QAM, the symbols can be envisioned as points in a Cartesian coordinate system with the real portion of the symbols along one axis and the imaginary portion of the symbols along the other axis as is shown in FIG. 2. This kind of diagram is referred to as a symbol constellation. An input symbol 201 may be characterized as a complex number such as 3+3i. Each complex symbol in a 16-QAM constellation may be uniquely mapped to a four digit binary number since there are 16 symbols in the alphabet. For example, the symbol 3+3i may be mapped to the binary number 0110. It will be appreciated that the binary numbers corresponding to the various symbols may be arbitrarily selected as long as each four digit binary number maps to a unique 16 QAM symbol.

When the symbol converter 106 receives the M bit streams from the serial to parallel converter 104, it parses each respective bit stream into groups of bits corresponding to the number of bits that represent the various symbols of the selected type of modulation, then maps the groups of symbols into the appropriate symbol. Thus, in a 16-QAM system, the bit streams are parsed into groups of four bits. Each group of four bits is then mapped to the corresponding 16-QAM symbol using a mapping substantially as described above. Alternatively, the conversion from bit stream to the 16-QAM symbol stream may be done by using the well known method of convolutional encoding. Still other embodiments may have a symbol converter 106 that transforms the stream of bits to QPSK, 64-QAM, or some other symbol constellation instead of 16-QAM.

Next, the M streams of complex symbols are sent from the symbol converter 106 to the M sub-channel processing blocks 108, 110, 112. For convenience, the processing block 108 for only the first sub-channel will be described in detail herein, inasmuch as the processing blocks for the other sub-channels 110, 112 operate in substantially similar fashion as the first processing block 108. To that end, turning to the first processing block 108, a data symbol stream $D_1$ is provided from the symbol converter 106 to the sync/pilot symbol insertion block 114. This block inserts synchronization ("sync") symbols and pilot symbols into the data symbol stream, $D_1$, yielding a composite symbol stream $S_1$. According to one embodiment of the present invention, the pilot and sync symbols are inserted into the various data symbol streams, $D_1$ to $D_M$ at positions determined by TDMA time slot structures as will be described in greater detail in relation to FIGS. 8–10. The composite stream $S_1$ is then sent to the pulse shape filter block 116, which shapes each pilot, sync, and data symbol for transmission. The purpose of the shaping is to bandlimit the spectrum of each sub-channel so that it does not overlap other sub-channels or signals.

Figure 3:
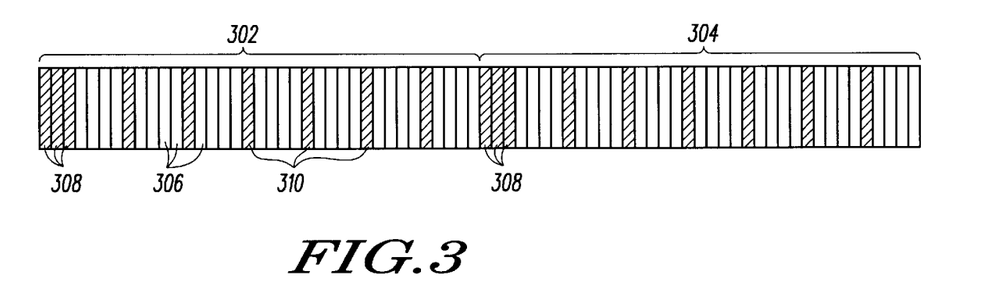
FIG. 3 shows an example of a symbol stream for two TDMA slots after insertion of synchronization and pilot symbols.

FIG. 3 shows an example of a composite symbol stream after the insertion of sync and pilot symbols for two TDMA time slots 302, 304 for a TDMA system. The time slots 302, 304 are comprised mostly of data symbols 306 that are obtained by mapping binary data to symbols from the symbol constellation. Sync symbols 308 are positioned at the beginning of each slot to allow the receiver to determine the best position to perform symbol sampling. The symbol stream also contains pilot symbols 310 inserted at selected intervals. The pilot symbols 310 are used by the receiver to determine the phase of the carrier and to estimate the effects of various channel impairments (e.g., noise, distortion) on the signal as it travels from transmitter to receiver. The receiver knows the characteristics of the pilot and sync symbols that will be transmitted as well as their position in the TDM time slot. This can be achieved by either using the same pilot and sync symbols for every time slot or by using the same algorithm in both the transmitter and receiver to calculate the sync and pilot symbols. It should be noted that the pilot and sync symbols do not have to come from the same signal constellation as the data symbols. When the receiver receives the signal, a comparison can be made between the pilot symbols received and the pilot symbols transmitted to allow the receiver to estimate the effects of the communication channel impairments. The received symbol stream can then be adjusted to compensate for phase and amplitude errors of the received data symbols.

Returning again to the sub-channel processing block 108 of FIG. 1, after passing through the pulse shape filter 116, each sub-channel stream must be frequency translated to a separate sub-carrier frequency. In one embodiment, this frequency translation is accomplished by a complex mixer 118, which modulates the sub-channel symbol stream by a sub-carrier signal 120. Preferably, each sub-carrier is at a different frequency so that the sub-channels do not overlap in frequency.

After the sub-channel symbol streams have been shifted up to their sub-carrier frequencies, these sub-channel outputs are combined by a summation block 122 to form a composite signal, S(t). The real and imaginary parts of the composite signal S(t) are separated by blocks 124, 126 and then provided to a quadrature upconverter 128. As is well known in the art, the quadrature upconverter mixes the real and imaginary parts of the composite signal S(t) up to radio frequency. The upconverted signal is supplied to an amplifier 130 and then applied to an antenna 132 for transmission.

In one embodiment of the invention, the operations of the pulse shape filter 116, sub-channel mixer 118, and summation block 122 are performed in a DSP using a fast Fourier transform (FFT) filter bank. The use of such a filter bank to implement a multi-sub-channel modulator is illustrated in "Multirate Digital Signal Processing" by Ronald E. Crochiere and Lawrence R. Rabiner, pp. 297–324, published by Prentice-Hall, Inc., incorporated herein by reference.

Figure 4:
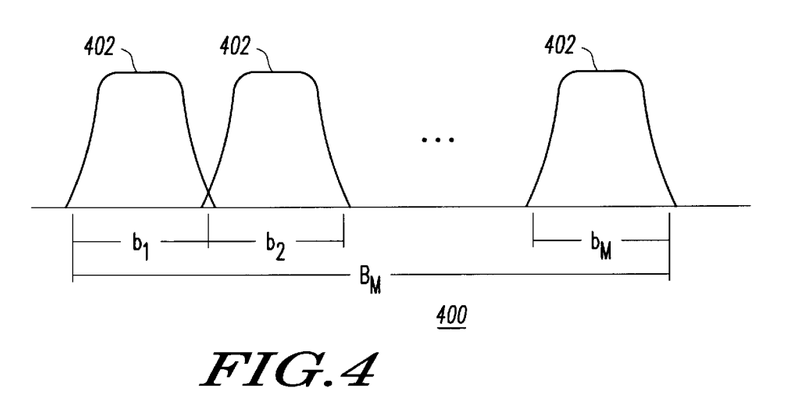
FIG. 4 shows an example of the frequency spectrum for an M sub-channel QAM system.

FIG. 4 shows one example of the frequency spectrum of the composite signal S(t) for an M sub-channel system. The composite signal S(t) is made up of M sub-channels 402 spanning respective sub-channel bandwidths $b_1, b_2, \ldots, b_M$, and the entire M sub-channels approximately span a bandwidth $B_M$. Generally, the number of sub-channels M may comprise an arbitrary number of sub-channels. The spacing of the sub-channels 402 is chosen to be far enough apart such that the sub-channels 402 do not significantly overlap yet are close enough together that the total bandwidth of the signal does not exceed the available bandwidth.

The bandwidth $B_M$ of the composite signal is also somewhat arbitrary but may be dictated by a regulatory authority, such as the Federal Communication Commission ("FCC") in the United States. For example, in the 746–806 MHz band, the FCC recommends a channelization strategy that would permit three channel types: 50 kHz, 100 kHz or 150 kHz. According to one embodiment of the present invention, the bandwidth $B_M$ comprises 50 kHz, 100 kHz or 150 kHz, and the number of sub-channels M comprises 8, 16, or 24 respectively, corresponding to those three channel types. In one embodiment, each sub-channel spans a bandwidth of 5.4 kHz. This results in an occupied signal bandwidth of 44 kHz, 87 kHz, and 130 kHz for the 8, 16, and 24 sub-channel embodiments, fitting into the respective 50 kHz, 100 kHz, and 150 kHz channel types. It will be appreciated, however, that the bandwidth $B_M$, the number of sub-channels and/or the sub-channel bandwidths may be tailored to suit different communication system parameters or different regulatory requirements.

As was illustrated in FIG. 3, in a TDMA communication system, the symbol stream for each sub-channel is divided into time slots. Each time slot contains a pattern of synchronization symbols, pilot symbols and data symbols that are repeated every time slot. Division of the symbol streams into time slots has several advantages. First, it provides a means for the communication channel to be shared among multiple users since the different time slots may be assigned to different users. For example, a transceiver may transmit a continuous stream of consecutive time slots with each of the time slots intended for a different receiver. In the other direction, the transceiver may receive consecutive time slots from different transmitters. Another advantage of time slots is that the synchronization symbols appear at regular intervals thereby allowing the receiver to stay in time synchronization with the transmitter. Still another advantage of time slots is that the digital data in the time slots is transmitted and received in constant size blocks. This is useful because it allows the radio functions that use the data such as the voice encoders and decoders and error control coders and decoders to be designed to use fixed size blocks of data. These encoders and decoders are simplified when they are designed to operate on fixed size blocks of data.

Figure 8:
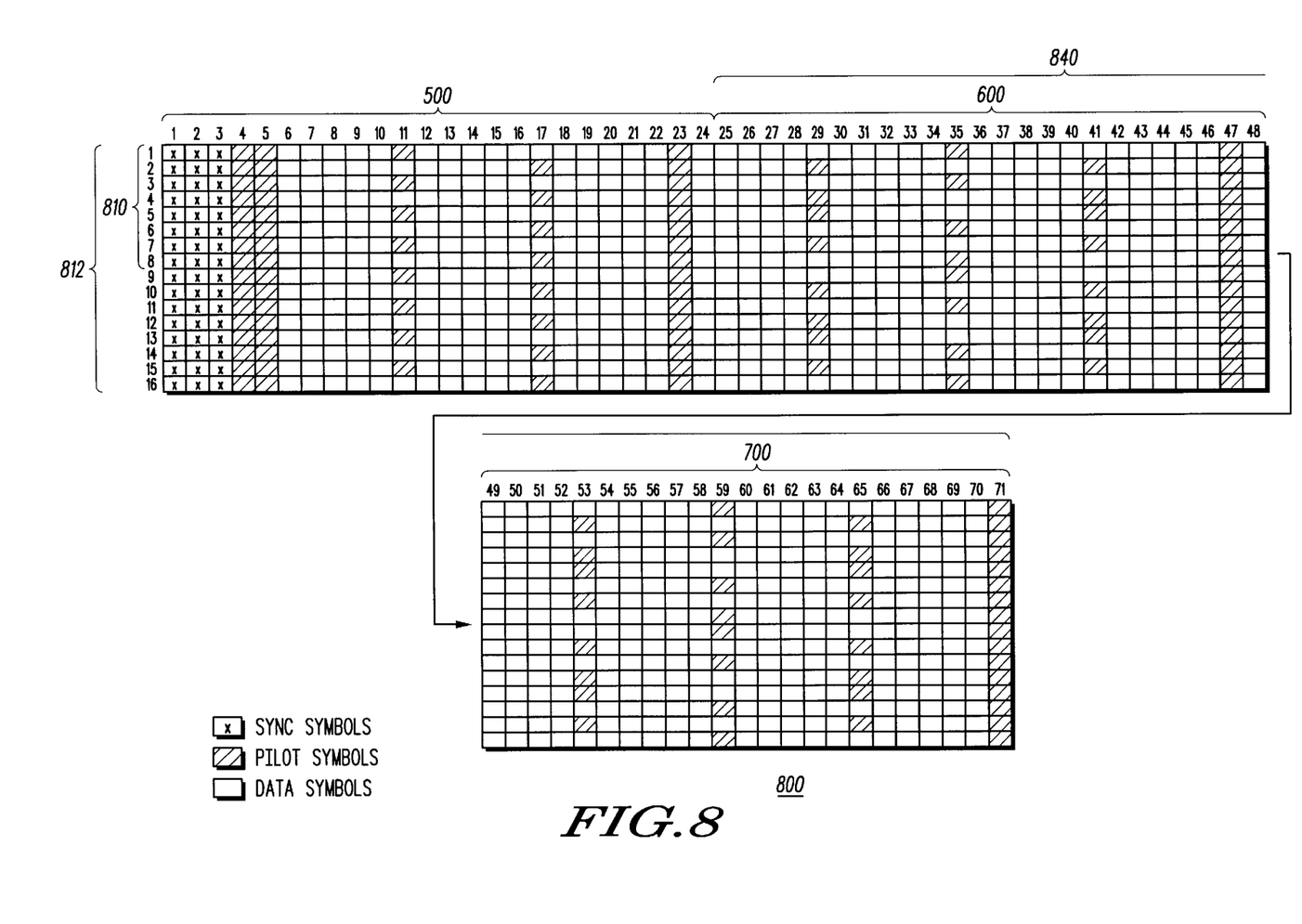
FIG. 8 shows a sixteen sub-channel TDMA slot structure showing locations of synchronization symbols, pilot symbols and data symbols.
Figure 9:
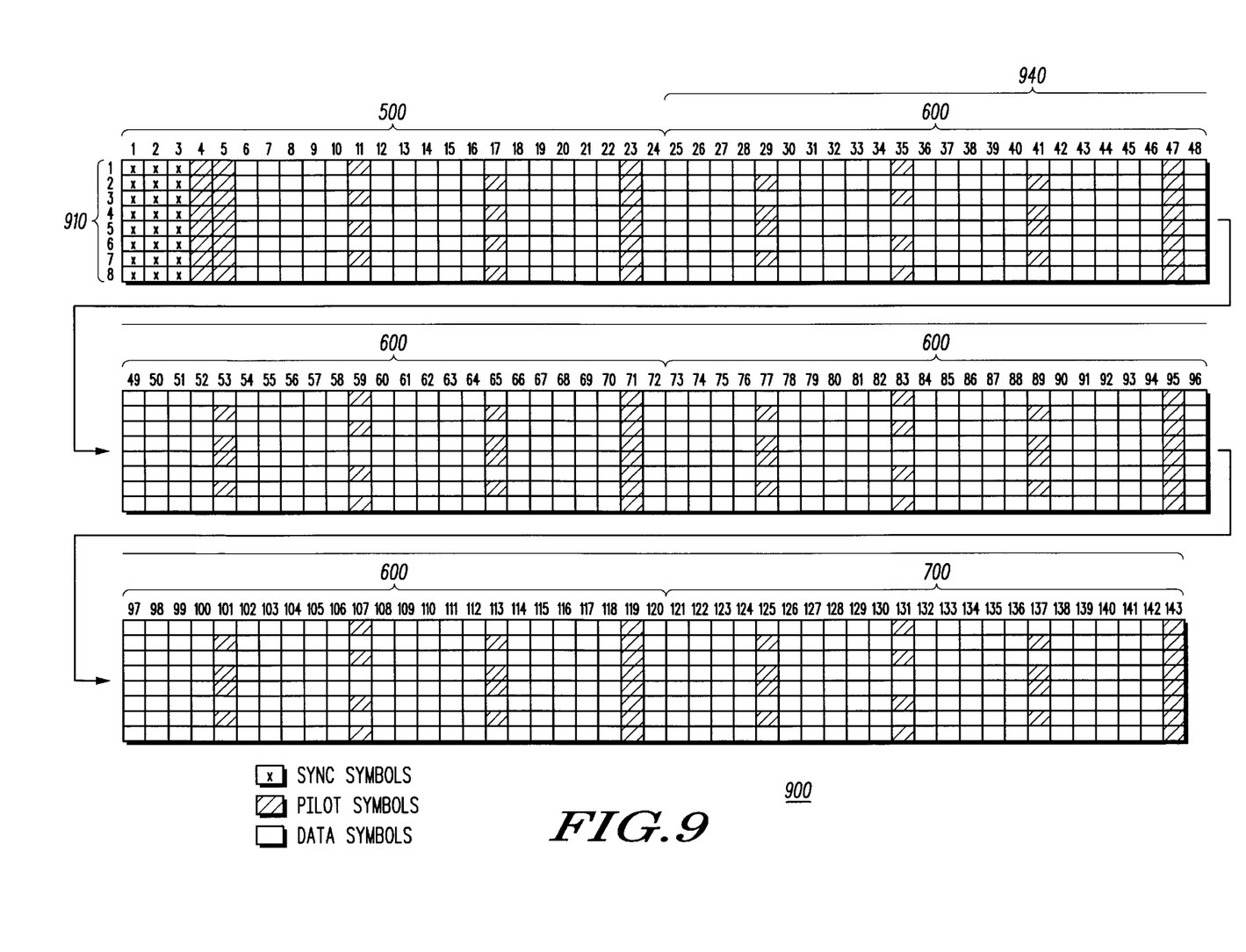
FIG. 9 shows an eight sub-channel TDMA slot structure showing locations of synchronization symbols, pilot symbols and data symbols.
Figure 10:
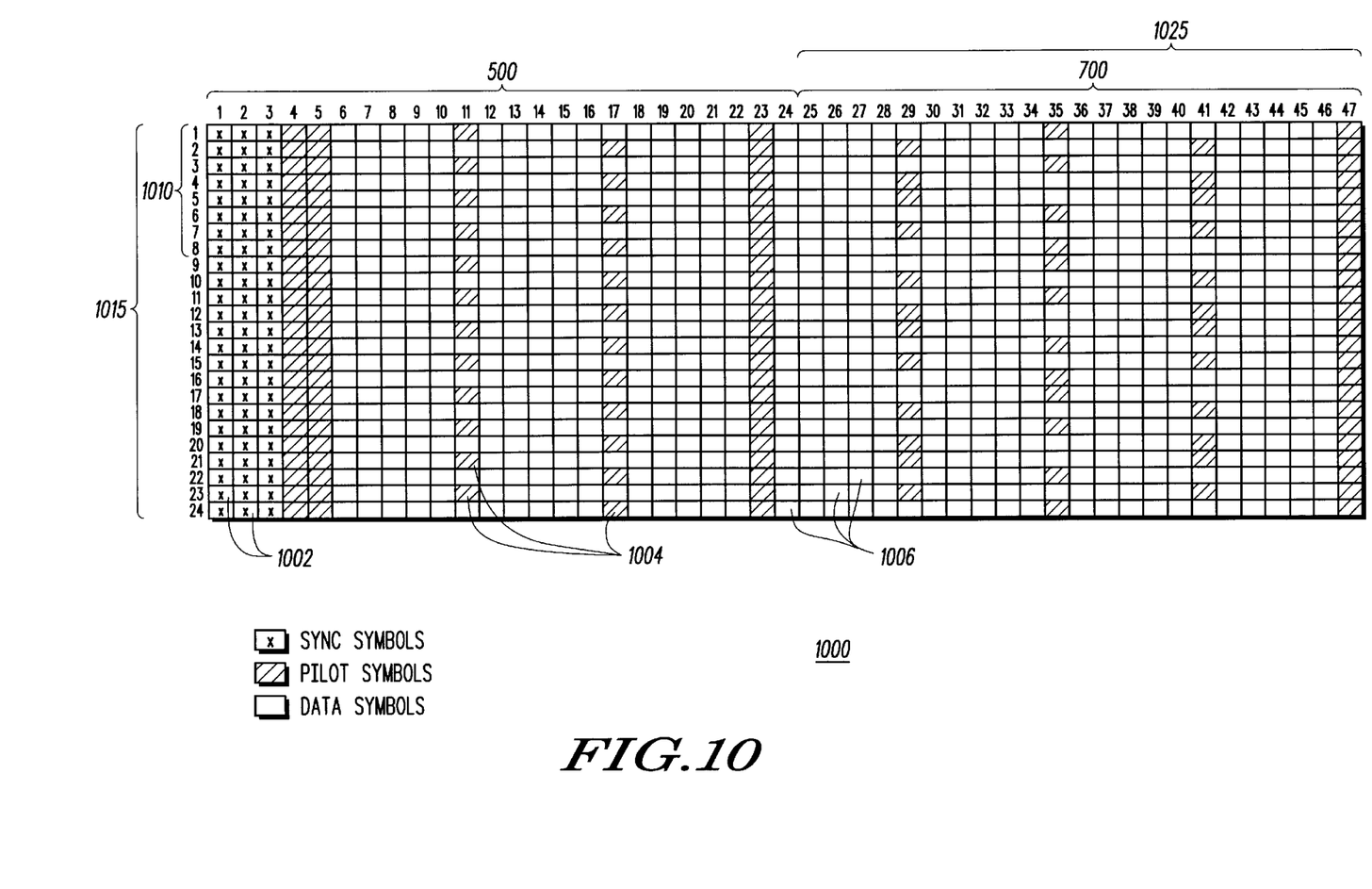
FIG. 10 shows a twenty-four sub-channel TDMA slot structure showing locations of synchronization symbols, pilot symbols and data symbols.

FIGS. 8–10 depict TDMA time slot structures identifying positions of synchronization symbols, pilot symbols and data symbols corresponding to bandwidths of 50 kHz, 100 kHz and 150 kHz according to one embodiment of the present invention. Despite having different bandwidths, the three slot structures have approximately the same number of data symbols. Each of the three TDMA slot structures was constructed using a combination of two kinds of patterns: an initial pattern and one or more follow-on patterns. The initial and follow-on patterns identify the positions of synchronization symbols, pilot symbols and data symbols for a portion of the TDMA time slot. To create the three TDMA slot structures of FIGS. 8–10, first the initial and one or more follow-on patterns were defined. Then the follow on patterns were consecutively joined to form an extended pattern. The extended pattern was appended to the initial pattern to form a base pattern identifying positions of data symbols, synchronization symbols and pilot symbols for the entire TDMA time slot for a first number of sub-channels. Depending on the available bandwidth, this base pattern was replicated zero or more times to form an expanded pattern that defines the positions of the synchronization symbols, pilot symbols, and data symbols for the entire TDMA time slot for the entire available signal bandwidth.

Figure 5:
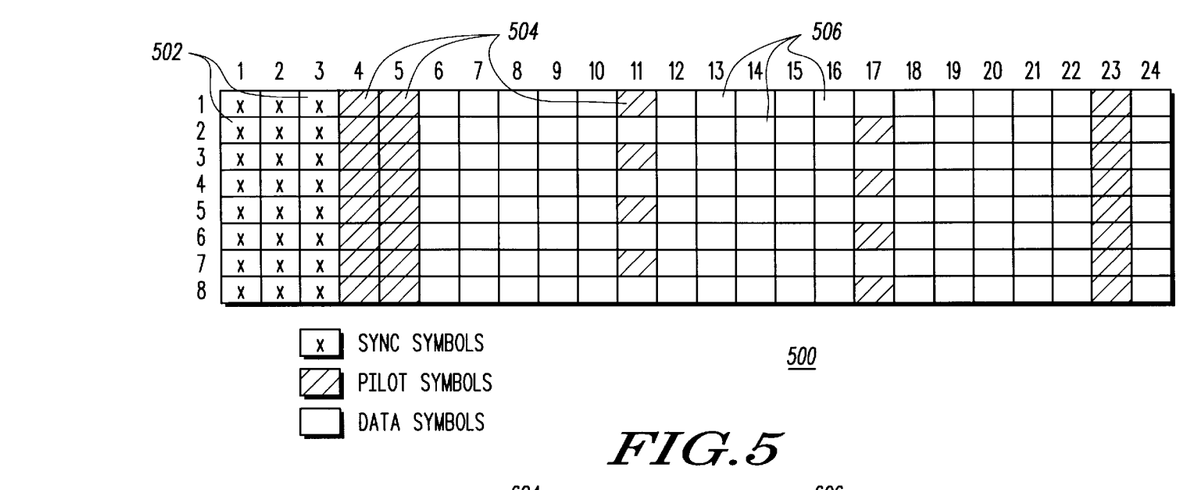
FIG. 5 shows an initial pattern of synchronization, pilot and data symbols for a portion of a TDMA slot.
Figure 6:
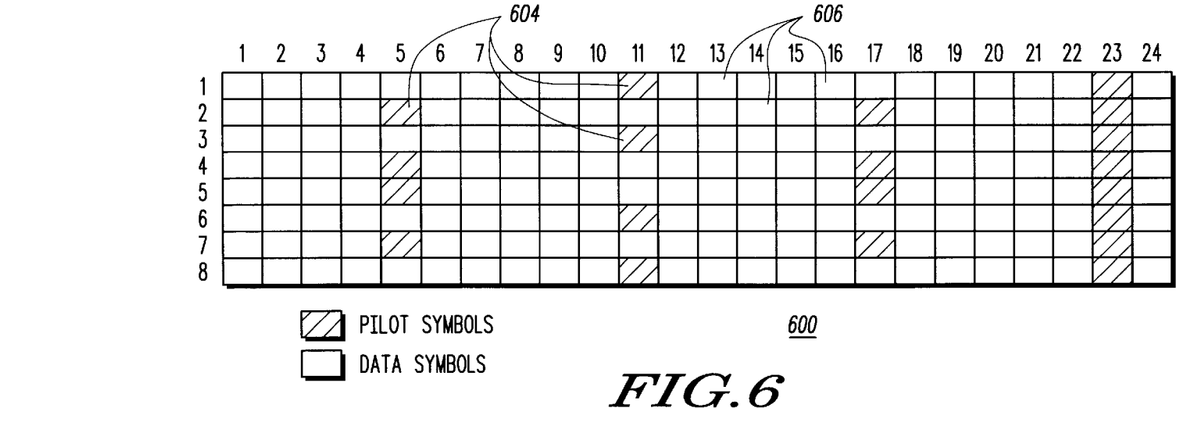
FIG. 6 shows a follow-on pattern of pilot and data symbols for a portion of a TDMA slot.
Figure 7:
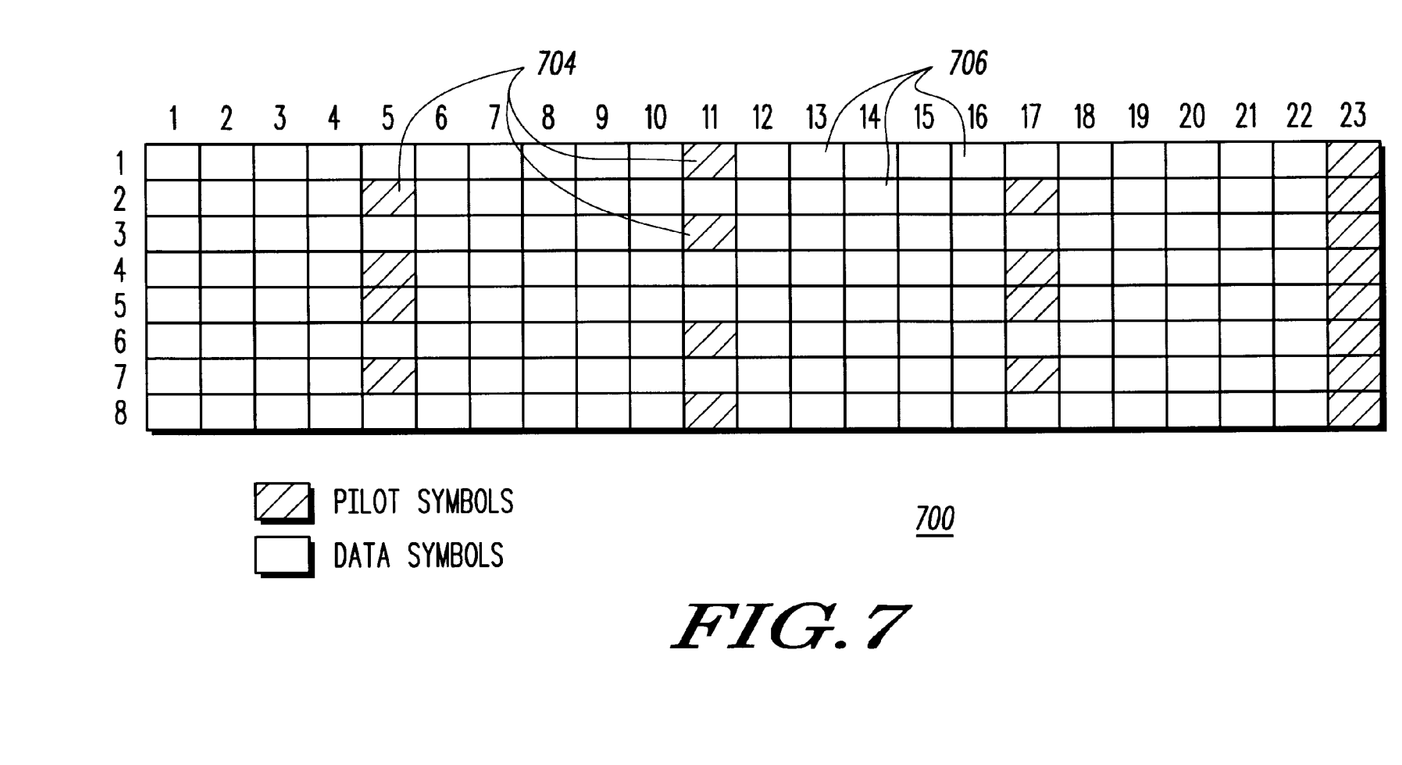
FIG. 7 shows an additional follow-on pattern of pilot and data symbols for a portion of a TDMA slot.

In one embodiment, for example, an initial pattern 500 is defined as shown in FIG. 5 and follow-on patterns 600, 700 are defined as shown in FIGS. 6–7. The eight sub-channels of the patterns labeled 1–8 are shown on the vertical axis of FIGS. 5–7. The horizontal axis represents time. Each square in FIGS. 5–7 represents the location of synchronization, pilot or data symbols in the respective pattern. Synchronization symbols are present in only the initial pattern 500 (FIG. 5) and are represented by the reference numeral 502. Pilot and data symbols are present in each of the patterns and are represented by the respective reference numeral 504, 506 (FIG. 5), 604, 606 (FIG. 6) and 704, 706 (FIG. 7). Further, the synchronization symbols 502 are shown by squares that contain an X, the pilot symbols 504, 604, 704 are shown by shaded squares and the locations of the data symbols 506, 606, 706 are shown by blank squares in FIGS. 5–7. In patterns 500 and 600 each sub-channel contains a total of 24 symbols, which are labeled 1–24 on the horizontal axis of FIGS. 5 and 6. In pattern 700 each sub-channel contains a total of 23 symbols, which are labeled 1–23 on the horizontal axis of FIG. 7. In one embodiment of the present invention the initial pattern 500 and follow-on pattern 600 span 5 milliseconds of time while the follow-on pattern 700 spans 4.792 milliseconds of time.

Extended patterns are constructed from combinations of follow-on patterns. In one embodiment, for example, the follow-on pattern 600 and the follow-on pattern 700 are consecutively joined to construct an extended pattern 840 (FIG. 8). In another embodiment, an extended pattern 940 (FIG. 9) is constructed by consecutively joining four follow-on patterns 700 and follow-on pattern 800. Extended patterns can also be constructed from only one follow-on pattern. For example, extended pattern 1025 (FIG. 10) is constructed from only one follow-on pattern 700. It will be appreciated that extended patterns other than those described above may be constructed by virtually any combination of patterns 600, 700 or from follow-on patterns that differ from patterns 600, 700.

After constructing an extended pattern, a base pattern is formed by appending the extended pattern to an initial pattern. In one embodiment, for example, a base pattern 810 (FIG. 8) is formed by appending the extended pattern 840 to the initial pattern 500. In another embodiment, the extended pattern 940 (FIG. 9) is appended to the initial pattern 500 to form a base pattern 910. In still another embodiment, a base pattern 1010 (FIG. 10) is formed by appending the extended pattern 1025 to the initial pattern 500. It will be appreciated that base patterns other than those shown in FIGS. 8–10 may be formed by virtually any combination of patterns 500, 600, 700 or from initial and follow-on patterns that differ from patterns 500, 600, 700.

The base patterns 810, 910, 1010 are made up of combinations of initial and follow-on patterns that are consecutively joined. The base pattern 910 of FIG. 9 is constructed by consecutively joining five follow-on patterns to an initial pattern. Of the five follow-on patterns, the first four are of a first type 600 (FIG. 6) and the last one is of a second type 700 (FIG. 7). The positions of synchronization, pilot and data symbols in the second type of follow-on pattern (FIG. 7) correspond substantially to the positions of synchronization, pilot and data symbols in the first type of follow-on pattern (FIG. 6); that is almost all of the symbol positions in FIGS. 6 and 7 are identical. The only difference is that the pattern of FIG. 6 has one additional symbol in each sub-channel that the pattern of FIG. 7 is missing. The base pattern 810 of FIG. 8 also is constructed from an initial pattern 500 (FIG. 5) and two types of follow-on patterns 600, 700 (FIG. 6, FIG. 7). That is the base pattern contains one follow-on pattern of the first type 600 (FIG. 6) and one follow-on pattern of the second type 700 (FIG. 7).

After forming the base pattern, the base pattern is replicated one or more times to form an expanded pattern that defines a TDMA time slot structure. Alternatively, the base pattern itself may be used as a TDMA slot structure. For example, according to one embodiment of the present invention, FIG. 8 shows a sixteen sub-channel TDMA time slot 800 that is suitable for use in a 100 kHz bandwidth with 5.4 kHz wide sub-channels. The TDMA time slot 800 was created by replicating the eight sub-channel base pattern 810 one time to form a sixteen sub-channel expanded pattern 812. Hence the pattern of synchronization, pilot and data symbols in sub-channels 1–8 is the same as the pattern of synchronization, pilot and data symbols in sub-channel 9–16.

According to another embodiment of the present invention, FIG. 9 shows an eight sub-channel TDMA time slot 900 that is suitable for use in a 50 kHz bandwidth when each sub-channel is 5.4 kHz wide. The TDMA time slot 900 is created from the eight sub-channel base pattern 910 without replication.

As still another example, FIG. 10 shows a twenty-four sub-channel TDMA time slot 1000 that is suitable for use in a 150 kHz bandwidth with 5.4 kHZ wide sub-channels. The TDMA time slot 1000 is an expanded pattern 1015 that was formed by replicating the 8 sub-channel base pattern 1010 two times. Hence the pattern of synchronization, pilot and data symbols in sub-channels 1–8 is the same as the pattern of synchronization, pilot and data symbols in sub-channel 9–16 and sub-channels 17–24

As FIGS. 8 and 10 show, replicating the base pattern creates the wider bandwidth signals. Generally, when the base pattern consists of P sub-channels and the base pattern is replicated N times, the expanded pattern will comprise (N+1)×P sub-channels, where N and P are integers, and the expanded pattern will generally occupy a bandwidth that is N+1 times greater than the bandwidth associated with the base pattern. That is, with reference to FIG. 4, if the expanded pattern comprises M sub-channels, and a composite signal is formed by modulating M separate carrier signals with M sub-channel symbol streams, the bandwidth $B_M$ of the composite signal will be N+1 times greater than a bandwidth $B_P$ of a composite signal that would result by performing corresponding steps with P sub-channels.

One advantage of constructing TDMA time slot structures by joining multiple patterns in time to form a base pattern and replicating the base pattern in frequency is that it allows a great deal of flexibility in terms of the occupied bandwidth of the slot, the length of the slot and the number of data symbols in the slot. For example, in the illustrated embodiments of FIGS. 8–10, even through the three slot patterns have three different bandwidths of 50 kHz, 100 kHz, and 150 kHz, the number of data symbols in the three patterns is almost the same. The 100 kHz TDMA time slot structure of FIG. 8 has 944 data symbols, the 50 kHz TDMA time slot structure of FIG. 9 has 988 data symbols and the 150 kHz TDMA time slot structure of FIG. 10 has 900 data symbols.

As will be appreciated, while FIGS. 8–10 illustrate particular TDMA time slot structures according to one embodiment of the current invention, other slot structures are possible. For example the initial and follow-on patterns can be varied to include different positions of data symbols, sync symbols and/or pilot symbols, different numbers of sub-channels, different lengths etc. The number of follow-on patterns consecutively joined to construct the base patterns can be changed. There can be more than two types of follow-on patterns defined. The base pattern can be replicated any number of times or not replicated at all to form the expanded pattern. However, in any case the TDM time slot structure will be created by joining an initial pattern to one or more follow-on patterns to form a base pattern that may be replicated one or more times to form an expanded pattern.

TDMA slot structures such as the ones illustrated in FIGS. 8–10 show where synchronization and pilot symbols are inserted into the data symbol streams in a multi-carrier transmitter such as the transmitter 100 of FIG. 1. A multi-carrier receiver can be used to recover the information from a signal sent by the transmitter 100. One such multi-carrier receiver is detailed in the U.S. patent application Ser. No. 09/630,235, titled "Scalable Pattern Methodology for Multi-Carrier Communication Systems" assigned to the assignee of the current invention and incorporated herein by reference in its entirety.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the step of transmitting a time slot comprising two or more replications of a base pattern defining positions of data symbols, synchronization symbols and pilot symbols for a first number of sub-channels corresponding to a first bandwidth,
wherein the base pattern comprises an initial pattern identifying positions of data symbols, synchronization symbols and pilot symbols for the first number of sub-channels corresponding to the first bandwidth, and an extension pattern appended to the initial pattern, the extension pattern comprising one or more follow on patterns consecutively joined so that they identify positions of data symbols, synchronization symbols and pilot symbols for the first number of sub-channels corresponding to the first bandwidth, and
wherein the two or more replications in combination define positions of data symbols, synchronization symbols and pilot symbols for a second number of sub-channels corresponding to a second bandwidth.

2. The method of claim 1 wherein the extension pattern comprises only one follow-on pattern.

3. The method of claim 1 wherein the extension pattern comprises a plurality of consecutively joined follow-on patterns.

4. The method of claim 3 wherein the extension pattern comprises two consecutively joined follow-on patterns.

5. The method of claim 4 wherein the follow-on patterns comprise first and second types of follow-on patterns and wherein the extension pattern comprises one of the first type of follow-on patterns consecutively joined to one of the second type of follow-on patterns.

6. The method of claim 5 wherein the positions of synchronization symbols, pilot symbols and data symbols defined in the second type of follow-on pattern correspond substantially to the positions of synchronization symbols, pilot symbols and data symbols defined in the first type of follow-on pattern.

7. The method of claim 6 wherein the second type of follow-on pattern differs from the first type of follow-on pattern only in the last position of synchronization symbols, pilot symbols and data symbols in each of the first number of sub-channels.

8. The method of claim 1 wherein the base pattern spans a length of approximately 15 milliseconds, the initial pattern spans a length of 5 milliseconds and each of the one or more follow-on patterns spans a length of approximately 5 milliseconds.

9. The method of claim 2 wherein the base pattern spans a length of approximately 10 milliseconds, the initial pattern spans a length of 5 milliseconds and the extension pattern spans a length of approximately 5 milliseconds.

10. The method of claim 1 wherein the time slot comprises two replications of the base pattern.

11. The method of claim 1 wherein the time slot comprises three replications of the base pattern.

12. A method comprising the step of transmitting a time slot comprising at least one replication of a base pattern defining positions of data symbols, synchronization symbols and pilot symbols for a first number of sub-channels corresponding to a first bandwidth,
wherein the base pattern comprises an initial pattern identifying positions of data symbols, synchronization symbols and pilot symbols for the first number of sub-channels corresponding to the first bandwidth, and an extension pattern appended to the initial pattern, the extension pattern comprising a plurality of follow on patterns consecutively joined so that they identify positions of data symbols, synchronization symbols and pilot symbols for the first number of sub-channels corresponding to the first bandwidth, and
wherein the at least one replication of the base pattern defines positions of data symbols, synchronization symbols and pilot symbols for a second number of sub-channels corresponding to a second bandwidth.

13. The method of claim 12 wherein the extension pattern comprises four consecutively joined identical follow-on patterns.

14. The method of claim 13 wherein the extension pattern further comprises an additional follow-on pattern consecutively joined to the four identical follow-on patterns.

15. The method of claim 14 wherein the positions of data symbols, synchronization symbols and pilot symbols of the additional follow-on pattern correspond substantially to the positions of data symbols, synchronization symbols and pilot symbols in each of the four identical follow-on patterns.

16. The method of claim 15 wherein the additional follow-on pattern differs from the four identical follow-on patterns only in the last position of data symbols, synchronization symbols and pilot symbols in each of the first number of sub-channels.

17. The method of claim 14 wherein the base pattern spans a time of 30 milliseconds, the initial pattern spans a time of 5 milliseconds, each of the four identical follow-on patterns spans a time of 5 milliseconds and the additional follow-on pattern spans a time of approximately 5 milliseconds.

18. The method of claim 12 wherein the base pattern spans a time of 30 milliseconds.

19. The method of claim 12 wherein the time slot comprises one replication of the base pattern so that the base pattern and time slot are identical.

20. A method comprising a communication device performing the steps of:

receiving an information signal and subdividing the information signal into M bit streams;

encoding each of the M bit streams to data symbols to form M symbol streams;

inserting synchronization and pilot symbols into each of the M symbol streams at positions determined by an expanded pattern, yielding M composite symbol streams filling a time-division multiplex slot, the expanded pattern comprising at least one replication of a base pattern identifying positions of the synchronization symbols and pilot symbols for a subset of the M composite symbol streams, the base pattern comprising an extension pattern appended to an initial pattern, the initial pattern defining positions of the synchronization symbols and pilot symbols for the subset of the M composite streams for a portion of the time division multiplex slot and the extension pattern comprising a plurality of identical follow-on patterns consecutively joined, the follow-on patterns defining positions of the synchronization symbols and pilot symbols for the subset of the M composite streams for a portion of the time division multiplex slot;

modulating separate carrier signals with each of the M composite symbol streams, yielding M sub-channels centered about a center frequency;

combining the M sub-channels into a composite signal; and transmitting the composite signal over an RF channel.

* * * * *